(12) United States Patent  (10) Patent No.: US 7,967,450 B2
Koyama et al.  (45) Date of Patent: Jun. 28, 2011

(54) LIGHT AMOUNT CONTROL DEVICE AND PROJECTOR

(75) Inventors: Fumio Koyama, Shirojiri (JP); Masashi Kiuchi, Ueda (JP)

(73) Assignee: Seiko Epson Corporation, Tokyo (JP)

( * ) Notice: Subject to any disclaimer, the term of this patent is extended or adjusted under 35 U.S.C. 154(b) by 666 days.

(21) Appl. No.: 12/040,014

(22) Filed: Feb. 29, 2008

(65) Prior Publication Data

US 2008/0218702 A1    Sep. 11, 2008

(30) Foreign Application Priority Data

Mar. 6, 2007 (JP) .................................. 2007-055336

(51) Int. Cl.
G03B 21/14 (2006.01)
(52) U.S. Cl. .......................................... 353/97; 353/85
(58) Field of Classification Search ............... 353/88, 353/89, 90, 91, 92, 93, 97
See application file for complete search history.

(56) References Cited

U.S. PATENT DOCUMENTS

| | | | | |
|---|---|---|---|---|
| 2004/0119950 A1* | 6/2004 | Penn et al. | ......................... | 353/97 |
| 2005/0001997 A1* | 1/2005 | Kawaai et al. | ................... | 353/97 |
| 2005/0052346 A1 | 3/2005 | Koyama | | |
| 2006/0164608 A1* | 7/2006 | Liu et al. | .......................... | 353/97 |
| 2006/0290901 A1* | 12/2006 | Moriyama et al. | ............... | 353/97 |
| 2007/0058133 A1* | 3/2007 | Totani | ............................. | 353/20 |
| 2007/0153238 A1* | 7/2007 | Takeuchi et al. | ................ | 353/97 |
| 2007/0195288 A1* | 8/2007 | Ahn | ................................ | 353/97 |
| 2009/0027572 A1* | 1/2009 | Kido et al. | ..................... | 348/751 |

FOREIGN PATENT DOCUMENTS

| | | |
|---|---|---|
| JP | A-2005-077868 | 3/2005 |
| JP | A 2006-064825 | 3/2006 |
| JP | A-2007-011393 | 1/2007 |

* cited by examiner

*Primary Examiner* — Georgia Y Epps
*Assistant Examiner* — Bao-Luan Le
(74) *Attorney, Agent, or Firm* — Oliff & Berridge, PLC

(57) ABSTRACT

A light amount control device that controls an amount of light acquired from a light source provided in an image display apparatus includes: a pulse generator; an operation processing portion for light amount control that outputs a transfer start signal at timing when the amount of light is controlled; a data setting circuit that is provided outside the operation processing portion and that stores data, in which various kinds of signals instructing the operation processing portion to set transfer data beforehand are set, in a memory; an address generator that is provided outside the operation processing portion and that sets an address in response to the transfer start signal output from the operation processing portion; a memory that is a main component included in the pulse generator and that outputs data on the basis of a memory address generated by the address generator; a pulse driven body whose operation direction and speed are determined by a pulse signal formed by data output from the memory and which is driven by a pulse; an actuator connected to the pulse driven body; and an opening capable of adjusting the amount of transmitted light according to an operation of the actuator inserted in an emission path of the light source.

17 Claims, 4 Drawing Sheets

LIGHT AMOUNT CONTROL DEVICE AND PROJECTOR

This application claims priority from Japanese Patent Application No. 2007-055336 filed in the Japanese Patent Office on Mar. 6, 2007, the entire disclosure of which is hereby incorporated by reference in its entirety.

BACKGROUND

1. Technical Field

The present invention relates to a light amount control device and a projector using the same.

2. Related Art

An image display device and a method of driving the same for suppressing an unnatural change in brightness of an image to thereby prevent a viewer from feeling uncomfortable are known (for example, refer to JP-A-2006-64825). Specifically, the image display device displays an image by modulating emitted light emitted from a light source. The image display device includes a 'mechanical lilt amount control unit that adjusts the light amount of the emitted light and a control unit that controls the light amount control unit such that the light amount continuously varies until reaching a targeted light amount after a predetermined period of time', which are arranged on an optical axis of the light source.

However, in the case of the technique disclosed in JP-A-2006-64825, improvements should be still made in the 'mechanical light amount control unit that adjusts the light amount of the emitted light and the control unit that controls the light amount control unit such that the light amount continuously varies when reaching a targeted light amount after a predetermined period of time'. For example, because most of the operation processing capability of an operation processing portion is used for control of the light amount control unit, there is a problem that a performance of the operation processing portion extremely deteriorates.

In addition, there is also a problem that an optimal technique which is maximal in cost effectiveness cannot be realized only with the individual technique disclosed in JP-A-2006-64825.

SUMMARY

An advantage of some aspects of the invention is that it provides a light amount control device capable of contributing to an improvement in the entire performance by assigning a processing capability of an operation processing portion for other functions and a projector using the light amount control device. In particular, the advantage of some aspects of the invention is that it provides the 'control unit that controls a light amount control unit' without an increase in cost by using an operation processing portion and a memory included in a known apparatus.

According to an aspect of the invention, a light amount control device that controls an amount of light acquired from a light source provided in an image display apparatus includes: a pulse generator; an operation processing portion for light amount control that outputs a transfer start signal at timing when the amount of light is controlled; a data setting circuit that is provided outside the operation processing portion and that stores data, in which various kinds of signals instructing the operation processing portion to set transfer data beforehand are set, in a memory; an address generator that is provided outside the operation processing portion and that sets an address in response to the transfer start signal output from the operation processing portion; a memory that is a main component included in the pulse generator and that outputs data on the basis of a memory address generated by the address generator; a pulse driven body whose operation direction and speed are determined by a pulse signal formed by data output from the memory and which is driven by a pulse; an actuator connected to the pulse driven body; and an opening capable of adjusting the amount of transmitted light according to an operation of the actuator inserted in an emission path of the light source.

In the light amount control device according to the aspect of the invention, the operation direction and speed of the pulse driven body are determined by a predetermined pulse signal. A pulse signal specified by the pulse width and the number of pulses required when the pulse driven body starts and stops and after starting of the pulse driven body is notified from the operation processing portion to the data setting circuit for setting of data to the memory and is then stored in the memory beforehand.

Then, when a transfer start signal from the operation processing portion is input to the address generator, data corresponding to the memory address that the address generator outputs is read from the memory. That is, a pulse signal is output from the pulse generator using the memory by one simple command referred to as a transfer start signal that does not give a load to the operation processing portion. The pulse driven body whose operation direction and speed are determined according to a pulse signal formed by the data operates. The actuator connected to the pulse driven body performs an operation corresponding to a specified control.

The actuator is inserted in the opening, which is an emission path of the light source. Therefore, the amount of transmitted light of the opening is adjusted by performing an opening/closing control on the opening according to the pulse signal. At this time, pulse signals of hundreds of pulses for light amount control are properly output, as data corresponding to a memory address, from hardware provided outside the operation processing portion without the operation processing portion involved. Accordingly, a load which deteriorates a performance of the operation processing portion does not occur.

Furthermore, in the light amount control device according to the aspect of the invention, it is preferable that an operation processing portion and/or a memory for image display apparatus control provided in the image display apparatus are/is also used for the light amount control. In this manner, an increase in cost can be suppressed.

Furthermore, in the light amount control device according to the aspect of the invention, it is preferable that the operation processing portion and/or the memory are/is included in a one-chip device. In this manner, an increase in cost can also be suppressed.

Furthermore, in the light amount control device according to the aspect of the invention, it is preferable that the pulse driven body is a stepping motor. In this case, pulse signals of hundreds of pulses used to drive a stepping motor, which rotates at high speed for light amount control, are output from the hardware provided outside the operation processing portion without the operation processing portion involved. Accordingly, it is possible to prevent a situation in which a performance of the operation processing portion deteriorates to control the stepping motor.

In addition, according to another aspect of the invention, there is provided a projector including the light amount control device described above. In this manner, it is possible to provide a projector capable of controlling the amount of light while suppressing an increase in cost.

BRIEF DESCRIPTION OF THE DRAWINGS

The invention will be described with reference to the accompanying drawings, wherein like numbers reference like elements.

DETAILED DESCRIPTION OF EMBODIMENTS

Figure 1:
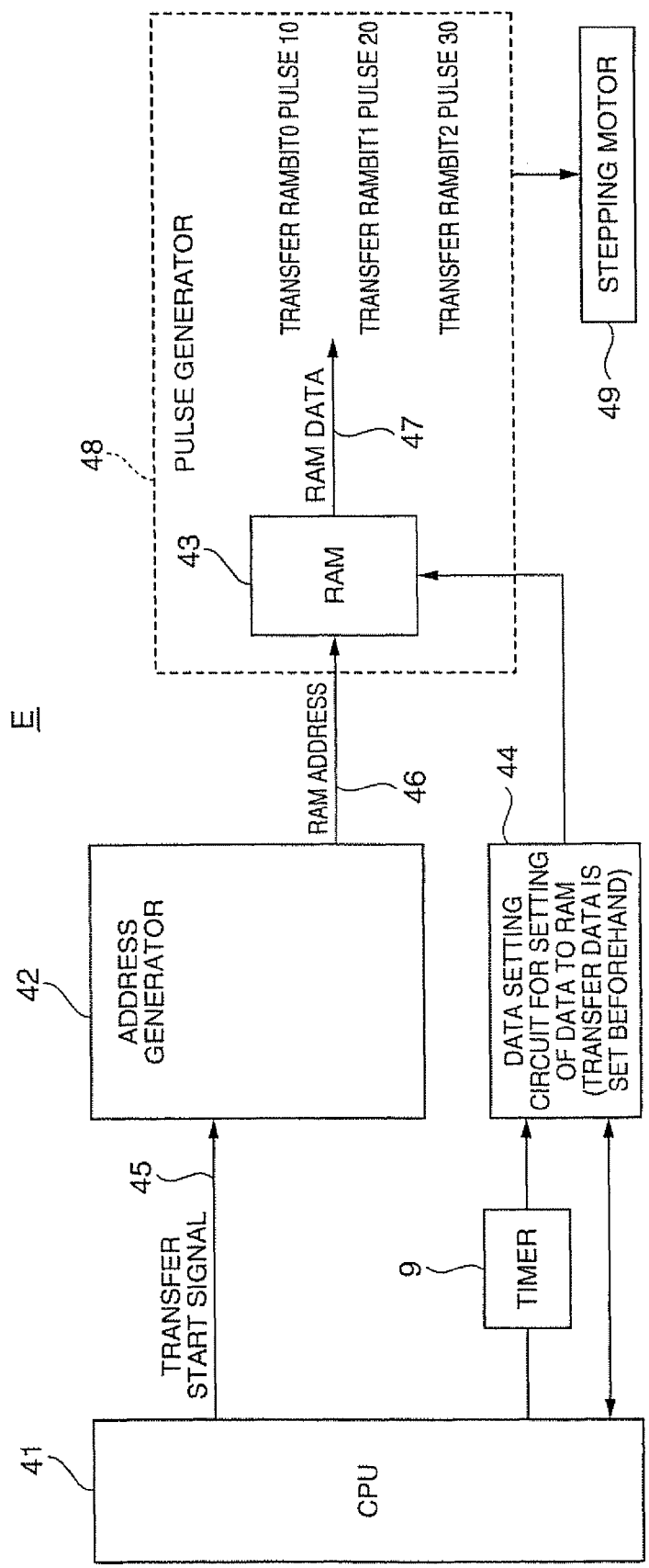
FIG. 1 is a block diagram illustrating a functional configuration of a light amount control device according to an embodiment (present embodiment) of the invention.

Hereinafter, a light amount control device according to an embodiment of the invention will be described with reference to the accompanying drawings. Moreover, in each drawing, components having the same function are denoted by the same reference numerals and repeated description thereof is accordingly omitted.

FIG. 1 is a block diagram illustrating a functional configuration of a light amount control device E according to an embodiment (hereinafter, referred to as 'present embodiment') of the invention. The light amount control device E shown in FIG. 1 is provided in a projector P, which is an image display apparatus P (using the same reference numeral P) to be described later with reference to FIG. 4, and a best result is obtained when used as the light amount control device E that controls the amount of light acquired from a light source X.

The light amount control device F is configured to include a CPU 41 for light amount control that is also used as a CPU for driving control of the projector P, a timer 9, an address generator 42, a RAM 43, and a data setting circuit 44 for setting of data to the RAM, which are hardware arranged outside the CPU 41. In addition, the timer 9 exists for the convenience of explanation. Even if the timer 9 is not provided, the same effect as the timer 9 may be obtained by cooperation of a transfer reference clock 13 and a transfer RAM address 46 shown in FIG. 3. In addition, it is preferable that the CPU 41 and/or the RAM 43 are/is simply configured as one chip.

Because the CPU 41 can output various kinds of signals indicating to set transfer data beforehand, the CPU 41 inputs the signals to the data setting circuit 44 for setting of data to the RAM to thereby store different signals, which are set by the data setting circuit 44 for setting of data to the RAM, in the RAM 43 beforehand. In addition, the CPU 41 properly outputs a transfer start signal 45 for the control of a light amount and then inputs the transfer start signal 45 to the address generator 42.

The address generator 42 is hardware arranged outside the CPU 41. The address generator 42 has a self-operating address generating function of setting an address while automatically counting up (incrementing) an address value in response to an input of the transfer start signal 45 output from the CPU 41.

The RAM 43 outputs RAM data 47 on the basis of the RAM address 46 generated by the address generator 42. The output RAM data 47 includes a pulse 10 based on transfer RAMbitO, a pulse 20 based on transfer RAMbit1, and a pulse 30 based on transfer RAMbit2 (refer to FIG. 3).

That is, when the CPU 41 that is also used for a light amount control outputs the transfer start signal 45 at timing when the amount of light acquired from the light source X for image display is controlled, the RAM data 47 corresponding to the RAM address 46, which is determined by the amount of light added or subtracted, is output from the RAM 43. Thus, a pulse generator 48 using the RAM 43 is formed.

In addition, a servo mechanism for generating a driving force, of which operating direction and speed are determined by the pulses 10 to 30 formed by the RAM data 47 output from the RAM 43 and which is driven by a pulse, is formed. A stepping motor 49, which is an example of the servo mechanism, operates to cause an actuator connected thereto, for example, a light shielding plate 5 (refer to FIG. 4) or a shutter or a louver (not shown) to perform a light amount control. The light amount control device E is configured to control the amount of light acquired from the light source X for image display by controlling an opening area of an opening 50, in which an actuator such as the light shielding plate 5 is provided, by movement of the actuator.

A feature related to the control of the stepping motor 49 in the light amount control device E is that a pulse signal applied to the stepping motor 49 is generated by hardware provided outside the CPU 41 without the CPU 41 involved. In this manner, a case in which the operation processing capability of the CPU 41 is assigned excessively for the light amount control disappears. That is, because an occupancy rate of the CPU 41 can be suppressed in a low state, a performance of the CPU 41 can be maintained high.

Figure 2:
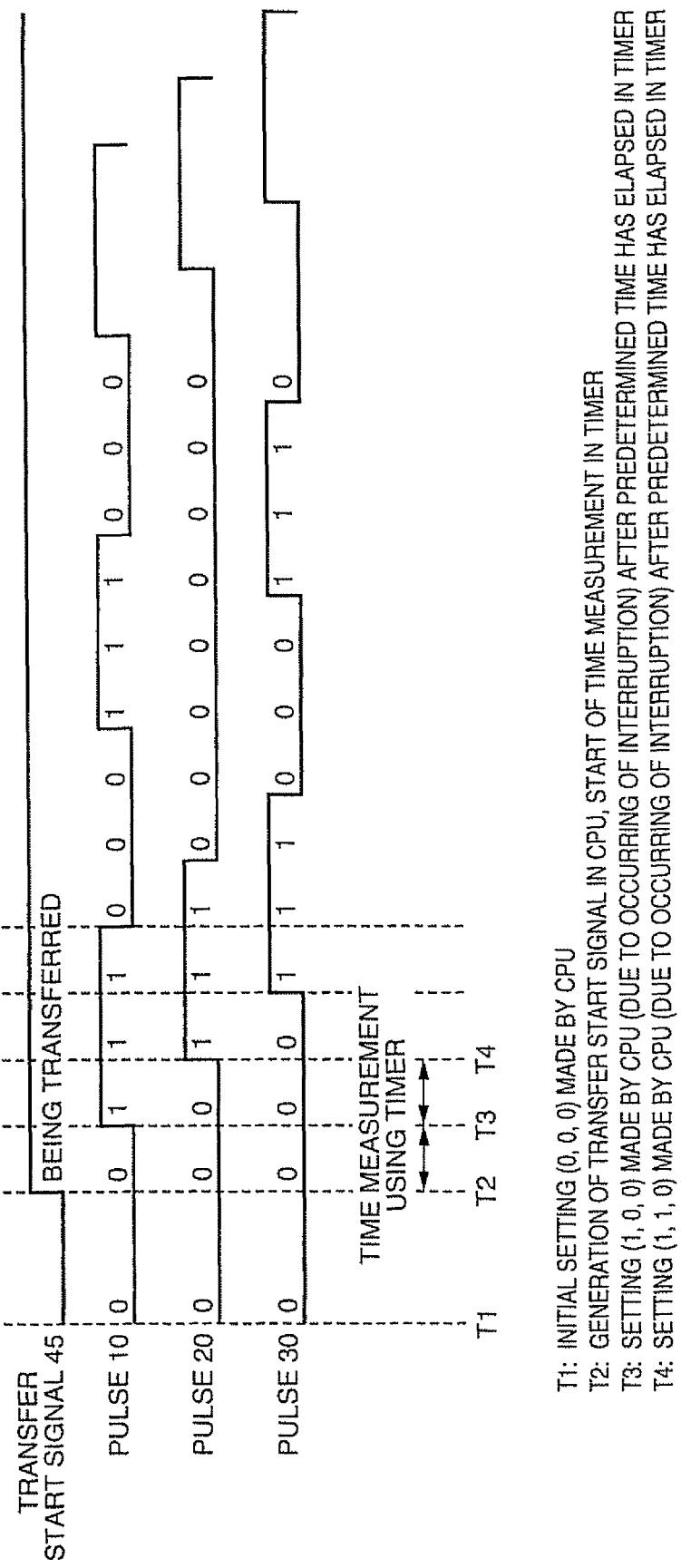
FIG. 2 is a timing chart illustrating a control step of a stepping motor in the light amount control device according to the present embodiment.

FIG. 2 is a timing chart illustrating a control step of the stepping motor 49 in the light amount control device E according to the present embodiment. Hereinafter, an operation will be described in detail while also properly referring to FIG. 1. As shown in FIG. 2, output forms of the pulses 10 to 30 corresponding to the transfer start signal 45 are specified at time T1 to T4 as the control step. The transfer start signal 45 is the RAM address 46 that the address generator 42 generates according to the transfer start signal 45 that the CPU 41 outputs. As the RAM data 47 based on the RAM address 46, the pulse 10 based on the transfer RAMbitO, the pulse 20 based on the transfer RAMbit1, and the pulse 30 based on the transfer RAMbit2 are output.

In addition, states at the time T1 to T4 shown in FIG. 2 are as follows.

T1: initial setting (0, 0, 0) made by the CPU 41

T2: generation of a transfer start signal in the CPU 41, start of time measurement in the timer 9

T3: setting (1, 0, 0) made by a CPU (due to occurring of interruption) after a predetermined time has elapsed in the timer 9

T4: setting (1, 1, 0) made by a CPU (due to occurring of interruption) after a predetermined time has elapsed in the timer 9

The rotation direction and speed of the stepping motor 49 are determined by a predetermined pulse signal, but the pulses 10, 20, and 30 corresponding to the pulse width and the number of pulses when the stepping motor 49 starts or stops or after starting of the stepping motor 49 are stored beforehand in the RAM 43. Accordingly, the pulses 10, 20, and 30 are notified beforehand from the CPU 41 to the data setting circuit 44 for setting of data to the RAM. Then, the CPU 41 commands hardware to output a pulse signal according to the necessity of light amount control.

When the transfer start signal 45 is input to the address generator 42 as a command from the CPU 41, the command becomes a request of operation start of the stepping motor 49. That is, the RAM data 47 corresponding to the RAM address 46 that the address generator 42 outputs is read from the RAM 43 and is applied to the stepping motor 49. At this time, the stepping motor 49 executes a required servo operation by means of one simple command referred to as the transfer start signal 45 output from the CPU 41. At this time, the RAM data 47 corresponding to the RAM address 46 properly outputs hundreds of pulses. Accordingly, there is no load applied to the CPU 41.

Hereinafter, an operation will be described in detail.

Each data notified from the CPU 41 is stored in the RAM 43 beforehand so as to be freely read. Here, the CPU 41 notifies the timer 9 of control timing in accordance with the rotation speed of the stepping motor 49. For example, at the start of the stepping motor 49, the CPU 41 outputs a signal instructing the start to the data setting circuit 44 for setting of data to the RAM and the timer 9. By the start instruction, the timer 9 outputs a request of pulse output to the data setting circuit 44 for setting of data to the RAM for every predetermined period.

The data setting circuit 44 for setting of data to the RAM reads start pulse data from the RAM 43 and outputs the read data to the stepping motor 49 in response to the pulse output request from the timer 9. When there is a next pulse output request from the timer 9, the data setting circuit 44 for setting of data to the RAM increments a start pulse address of the RAM 43, reads data from the RAM 43, and outputs the read data to the stepping motor 49.

The data setting circuit 44 for setting of data to the RAM ends a start control when the data is output to the stepping motor 49 by the number of pulses notified from the CPU 41. The data setting circuit 44 for setting of data to the RAM 43 outputs to the stepping motor 49 a pulse after start, which is written in the RAM 43 and a control step after the start, at the time of a pulse output request from the timer 9 until the CPU 41 makes a stop request.

The CPU 41 makes a stop request to the data setting circuit 44 for setting of data to the RAM 43 in the case of stopping the stepping motor 49. In response to the stop request, the data setting circuit 44 for setting of data to the RAM reads stop pulse data of the RAM 43 at the timing of a next pulse output request from the timer 9 and outputs the read data to the stepping motor 49.

When the data is output to the stepping motor 49 by the number of stop pulses notified from the CPU 41, the data setting circuit 44 for setting of data to the RAM 43 ends a stop processing of the stepping motor 49 and notifies the CPU 41 that the stop processing has ended. The CPU 41 makes an ending instruction to the timer 9 in response to the notice of end of stop processing from the data setting circuit 44 for setting of data to the RAM.

Hereinafter, the operation will be described in more detail.

Figure 3:
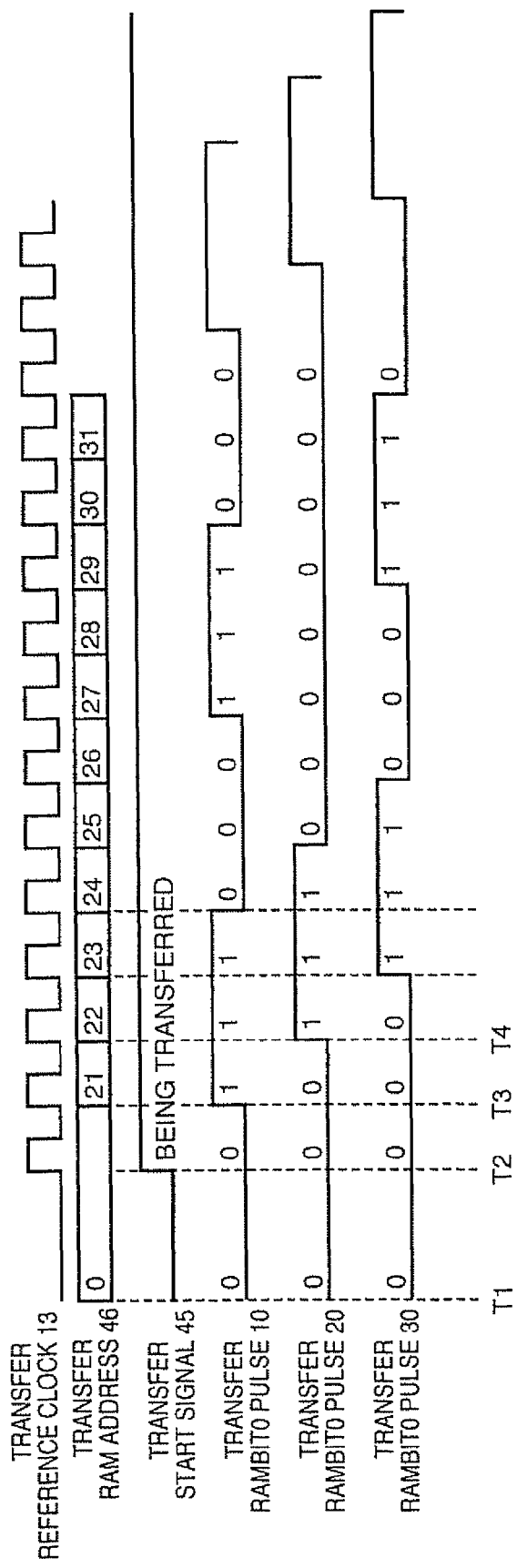
FIG. 3 is a timing chart illustrating a pulse signal for controlling the stepping motor in the light amount control device according to the present embodiment.

FIG. 3 is a timing chart illustrating a pulse signal for controlling a stepping motor in the light amount control device E according to the present embodiment. As shown in FIG. 3, output forms of the transfer RAM address 46, the transfer reference clock 13, and the pulses 10 to 30 corresponding to the transfer start signal 45 are specified at time TI to T4. In addition, as the transfer reference clock 13, a known clock signal is used for the CPU 41. Along the transfer reference clock 13, the transfer RAM address 46 is incremented to 21, 22, . . . , and 31.

Furthermore, states at the time T1 to T4 shown in FIG. 3 are as follows.

T1: initial setting (0, 0, 0) made by the CPU 41
T2: generation of a transfer start signal in the CPU 41, data output of an address 0 of the RAM 43
T3: data output of an address 21 of the RAM 43
T4: data output of an address 22 of the RAM 43

The address generator 42 generates the RAM address 46 according to the transfer start signal 45 that the CPU 41 outputs As the RAM data 47 based on the RAM address 46, the pulse 10 based on the transfer RAMbitO, the pulse 20 based on the transfer RAMbit1, and the pulse 30 based on the transfer RAMbit2 are output.

Such configuration, operation, and effects of the light amount control device E will be described below.

In the projector P (refer to FIG. 4), in order to perform a light amount control, the opening area of the opening 50 for light amount control is controlled by moving the light shielding plate 5 using the stepping motor 49. However, when the light amount control is performed using a general-purpose output port of the CPU 41 without any consideration, the performance extremely deteriorates because most of the operation processing capability of the CPU 41 is used for the control of the opening 50.

For this reason, control sequences are stored beforehand in the RAM 43 so as to be freely read and written. In this case, operations based on the control sequences are automatically performed until the end only by causing the CPU 41 to output the transfer start signal 45 from data stored in the RAM 43 at proper timing and outputting the RAM address 46 to the address generator 42 such that the RAM 43 starts to output the RAM data 47 on the basis of the RAM address 46.

Thus, the light amount control device E is configured to include a circuit used for only control in which the RAM 43 is built. In this way, it becomes possible to assign the processing capability of the CPU 41 for other unctions. This contributes to an improvement in the entire performance. The built-in RAM 43 may be an independent device from a point of view of a functional configuration. However, according to manufacturing technology of a semiconductor device in recent years, the RAM 43 may be provided inside without an increase in cost from a point of view of an internal configuration of a microcomputer or the like.

In the projector P, a light amount control device is controlled using the stepping motor 49 or the like (light is blocked by moving the light shielding plate 5 or the like) when performing the light amount control. However, in the case when the light amount control is performed using a general-purpose output port in the CPU 41 or the like, most of the operation of the CPU 41 is used in controlling the device. As a result, the performance extremely deteriorates. Specifically, the control steps shown in FIGS. 2 and 3 are operations performed in one light control and occur by 500 to 600 steps.

The operations and effects of the light amount control device E are summarized as follows.

Set pulse data is stored in the RAM 43 beforehand. For the light amount control, the transfer start signal 45 is properly output from the CPU 41. Thus, data of the RAM 43 is output according to address count up until transfer is completed, without the CPU 41 involved. By a pulse signal that is output, the light control using the stepping motor 49 that is driven by a pulse is executed. Unlike the related art, a load applied to the CPU 41 is extremely reduced when generating the pulses 10 to 30 for driving the stepping motor 49.

In addition, operations and effects of the projector P including the light amount control device E are as follows. The light amount control device E performs light amount control by using the stepping motor 49 that is driven by a pulse. The stepping motor 49 operates as a servomotor having a servo function of controlling the angle of the light shielding plate 5. The light shielding plate 5 controls the amount of light required for image display by controlling the opening area of the opening 50 through which light is acquired from the light source X.

That is, instead of generating hundreds of pulses in the CPU 41, by causing the CPU 41 to output the transfer start signal 45 for starting the light amount control only once to a circuit (hardware) used for only control in which the RAM 43 is built, an output of data of control sequences stored in advance in the RAM 43 maybe started at appropriate timing. In this way, it becomes possible to automatically execute light control and to end the operation with one simple command of the CPU 41.

Due to a series of light amount control operations, the operation processing capability of the CPU 41 is not wasted. Accordingly, it becomes possible to assign the processing capability of the CPU 41 for other functions, which contributes to an improvement in the entire performance. In addition, because a CPU or a RAM included in a one-chip microcomputer that already exists in the projector P are also used as the CPU 41 or the RAM 43, an increase in cost is suppressed.

Figure 4:
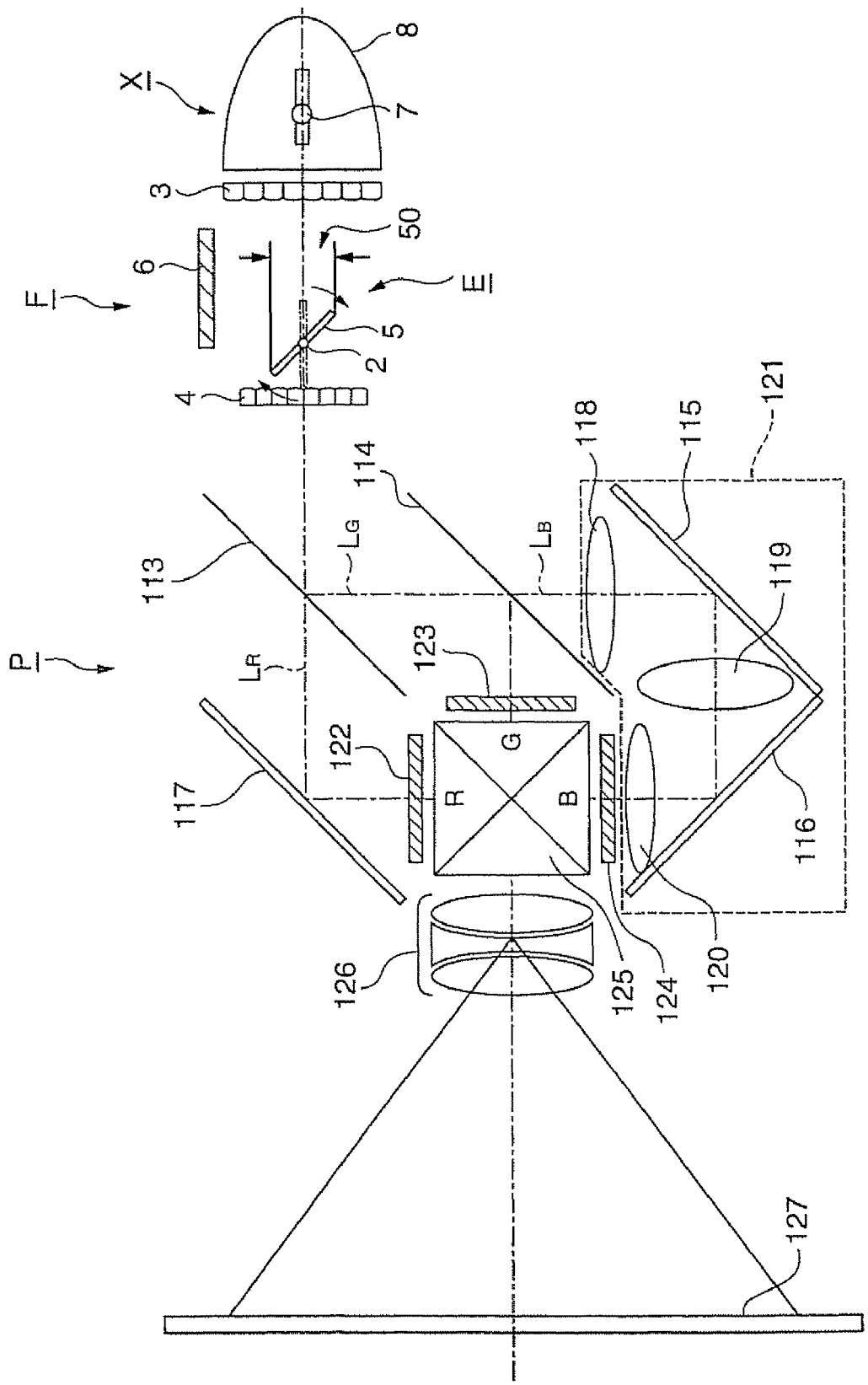
FIG. 4 is a view schematically illustrating the configuration of a projector using the light amount control device according to the present embodiment.

FIG. 4 is a view schematically illustrating the configuration of the projector P using the light amount control device E according to the present embodiment. As shown in FIG. 4, the projector P is a three-plate-type liquid crystal projector P configured to include: an illuminating device F; and transmissive liquid crystal light valves provided for different colors of R (red), G (green), and B (blue).

The illuminating device F is configured to include the light source X, the light amount control device E, fly-eye lenses 3 and 4, the light shielding plate 5, and a light absorber 6. The light source X is configured to include a lamp 7, such as a high-pressure mercury lamp, and a reflector 8 that reflects light emitted from the lamp 7. Furthermore, the light amount control device E includes the opening 50 capable of adjusting the amount of transmitted light by controlling an actuator 5 (using the same reference numeral) inserted in an emission path of the light source X, that is, by controlling the light shielding plate 5 (using the same reference numeral).

The fly-eye lenses 3 and 4 are substantially convex lenses that cause light, which is emitted in the radiating direction from the light source X, to be aligned in parallel and serve to make the illuminance distribution of emitted light emitted from the light source X approximately uniform in liquid crystal light valves 122, 123, and 124 that are illuminated regions. The fly-eye lenses 3 and 4 are arranged in the order of the first fly-eye lens 3 and the second fly-eye lens 4 from a side of the light source X. Here, the first fly-eye lens 3 forms a plurality of secondary light source images, and the second fly-eye lens 4 has a function as a superposition lens that superimposes the plurality of secondary light source images at the light valve positions.

In the projector P, the light shielding plate 5, which serves as a light amount control unit that adjusts the light amount of emitted light emitted from the light source X, is a functional member that is interposed between the fly-eye lenses 3 and 4 and controls an opening area of the opening 50 that controls the amount of light acquired from the light source X. That is, the light shielding plate 5 is rotatably provided between the first fly-eye lens 3 and the second fly-eye lens 4 in order to change a projected area. The light shielding plate 5 is driven to rotate by means of the stepping motor 49 (refer to FIG. 1) connected through a rotating shaft 2. The stepping motor 49 is servo operated by a command of the CPU 41.

In addition, the light absorber 6 is provided above the first fly-eye lens 3 and the second fly-eye lens 4. In addition, configurations and functions of dichroic mirrors 113 and 114, reflecting mirrors 115, 116, and 117, the liquid crystal light valves 122, 123, and 124, a cross dichroic prism 125, and a projection lens 126 will be described later.

The light source X is configured to include the lamp 7, such as a high-pressure mercury lamp, and the reflector 8 that reflects light emitted from the lamp 7. In addition, each of the fly-eye lenses 3 and 4 is configured to include a plurality of lenses (for example, 6×8 lenses) and serves to make the illuminance distribution of light emitted from the light source X uniform in liquid crystal light valves that are illuminated regions.

As a light amount control unit that adjusts the amount of light emitted from the light source X, one light shielding plate 5 having a rectangular shape is rotatably provided between the first fly-eye lens 3 and the second fly-eye lens 4. The light shielding plate 5 is provided near the second fly-eye lens 4, which is positioned so as to be close to the light source light values, of the two fly-eye lenses 3 and 4. The width of the light shielding plate 5 is set to be equal to or smaller than a half of the gap between the two fly-eye lenses 3 and 4.

The rotating shaft 2 extending in the horizontal direction is provided in the middle of the light shielding plate 5. A driving unit that is the stepping motor 49 is connected to the rotating shaft 2, such that the light shielding plate 5 can be rotated at high response speed when a driving signal from the pulse generator 48 is received.

The light shielding plate 5 is formed, for example, of a material, such as aluminum, steel, and stainless steel, and a surface of the light shielding plate 5 facing the light source X according to a rotation angle becomes a reflection surface from which light emitted from the light source X is reflected. Therefore, as an area of the light shielding plate 5 facing the light source X according to a rotation angle is the larger, the larger amount of light emitted from the light source X is blocked.

Hereinafter, the configuration of each stage of the projector P will be described together with an operation of each constituent component.

The dichroic mirror 113 that reflects blue and green light causes red light $L_R$ among light components, which are emitted from the light source X, to be transmitted therethrough and blue light $L_B$ and green light $L_G$ to be reflected therefrom. The red light $L_R$ having been transmitted through the dichroic mirror 113 is reflected by the reflecting mirror 117 to be then incident on the liquid crystal light valve 122 for red light.

On the other hand, among color light components reflected by the dichroic mirror 113, the green light $L_G$ is reflected by the dichroic mirror 114 for reflection of green light to be then incident on the liquid crystal light valve 23 for green light. On the other hand, the blue light $L_B$ is transmitted through the dichroic mirror 114 and is then incident on the liquid crystal light valve 124 for blue light through a relay system 121 configured to include a relay lens 118, the reflecting mirror 115, a relay lens 119, the reflecting mirror 116, and a relay lens 120.

Three color light components modulated by the liquid crystal light valves 122, 123, and 124 are incident on the cross dichroic prism 125. This prism is formed by bonding four rectangular prisms together, and a dielectric multilayer that reflects red light and a dielectric multilayer that reflects blue light are crosswise disposed on an inner surface thereof. Three color light components are combined by the dielectric multilayers, such that light displaying a color image is formed. The combined light is projected onto a screen 127 by means of the projection lens 126 that is a projection optical system, and thus an enlarged image is displayed.

The projector P according to the present embodiment has a configuration in which a rotatable light shielding plate 5 is provided between the two fly-eye lenses 3 and 4, which form a uniform illumination unit, and the light shielding plate 5 rotates at high speed on the basis of a video signal. Accordingly, the amount of light is adjusted such that the amount of light is increased in a bright image scene of the projector P and the amount of light is decreased in a dark scene, for example. Thus, even if the light output intensity of the light source X, such as a high-pressure mercury lamp in which it is difficult to control the light output intensity, is kept constant, illumination light having brightness corresponding to an image can be obtained in liquid crystal light valves. This contributes to increasing a dynamic range of the projector P.

In addition, the technique of the light amount control device E according to the embodiment of the invention may also be applied to the projector P using a device, such as a DMD (digital micromirror device: registered trademark of Texas Instrument Co. Ltd., U.S.A).

What is claimed is:

1. A light amount control device that controls an amount of light from a light source to a light modulation device in an image display apparatus, comprising:
    a pulse driven body whose operation direction and speed are determined by a pulse signal, the pulse-driven body being driven by a pulse;
    an operation processing portion that outputs a transfer start signal for controlling the amount of light;
    an address generator that generates an address in response to the transfer start signal output from the operation processing portion;
    a pulse generator, which includes a memory that stores data constituting the pulse signal, that outputs the data stored in the memory at the address generated by the address generator as the pulse signal;
    a data setting circuit that sets the data constituting the pulse signal beforehand in the memory, according to instruction from the operation processing portion; and
    a light shielding element that is connected to the pulse driven body and that shields the light from the light source.

2. The light amount control device according to claim 1, at least one of the following being used for the light amount control:
    (i) the operation processing portion; and
    (ii) an image display apparatus control memory for image display apparatus, control.

3. The light amount control device according to claim 1, the operation processing portion and the memory being included in a one-chip device.

4. The light amount control device according to claim 1, the pulse driven body being a stepping motor.

5. A projector comprising the light amount control device according to claim 1.

6. A light amount control device, comprising:
    (i) an aperture setting device;
    (ii) a memory unit;
    (iii) an address generator; and
    (iv) a processing unit;
    the processing unit:
        (a) determining a desired aperture setting; and
        (b) outputting an address generation signal to the address generator based on the desired aperture setting;
    the address generator:
        (a) receiving the address generation signal;
        (b) generating a memory address corresponding to the desired aperture setting; and
        (c) outputting to the memory unit, a memory address signal based on the determined memory address;
    the memory unit:
        (a) storing predetermined light amount control settings;
        (b) outputting to the aperture setting device, a light amount control setting signal based on the predetermined light amount control setting that is stored in a memory location corresponding to the memory address signal;
    the aperture setting device controlling the amount of light that is transmitted through an aperture based on the light amount control setting signal.

7. The light amount control device according to claim 6, the processing unit determining the desired aperture setting based on a desired brightness level of an image signal.

8. The light amount control device according to claim 7, the image signal being a video signal.

9. The light amount control device according to claim 8, the desired brightness level of the image signal being determined on a frame-by-frame basis.

10. The light amount control device according to claim 6, further comprising:
    a light shielding plate that is positioned between a plurality of lenses,
    wherein the aperture setting device controls the movement of the light shielding plate, thereby controlling the amount of light that is transmitted through the aperture.

11. The light amount control device according to claim 10, the plurality of lenses being positioned to ensure a substantially uniform light distribution.

12. The light amount control device according to claim 10, the aperture setting device controlling at least one of:
    (i) the speed with which the light shielding plate moves; and
    (ii) the direction that the light shielding plate moves.

13. The light amount control device according to claim 10, the aperture setting device including a stepping motor.

14. The light amount control device according to claim 11, the plurality of lenses being fly-eye lenses.

15. The light amount control device according to claim 6, the processing unit and the memory unit being included in a one-chip device.

16. A projector comprising the light amount control device according to claim 6.

17. A light amount control method, comprising:
    providing an image display apparatus that includes an aperture setting device, a memory unit, an address generator, and a processing unit;
    determining a desired aperture setting by the processing unit;
    outputting, from the processing unit, an address generation signal to the address generator based on the desired aperture setting;
    receiving, by the address generator, the address generation signal;
    generating, by the address generator, a memory address corresponding to the desired aperture setting;
    outputting, by the address generator, a memory address signal to the memory unit based on the generated memory address;
    storing predetermined light amount control settings in the memory unit;

outputting, from the memory unit, a light amount control setting signal to the aperture setting device based on the predetermined light amount control setting that is stored in a memory location corresponding to the memory address signal; and controlling, by the aperture setting device, the amount of light that transmits through an aperture based on the light amount control setting signal.

* * * * *